United States Patent [19]

Kuhn et al.

[11] 4,408,647
[45] Oct. 11, 1983

[54] VEHICLE WHEEL

[75] Inventors: Dieter Kuhn, Burgwedel; Heinz-Dieter Rach, Garbsen; Udo Frerichs; Henner Pieper, both of Langenhagen, all of Fed. Rep. of Germany

[73] Assignee: Continental Gummi-Werke Aktiengesellschaft, Hanover, Fed. Rep. of Germany

[21] Appl. No.: 266,336

[22] Filed: May 22, 1981

[30] Foreign Application Priority Data

May 23, 1980 [DE] Fed. Rep. of Germany ....... 3019742

[51] Int. Cl.³ ............................................. B60B 21/10
[52] U.S. Cl. .............................. 152/330 RF; 152/387
[58] Field of Search ................. 152/330 RF, 387, 388, 152/397, 399

[56] References Cited

U.S. PATENT DOCUMENTS 4,169,496  10/1979  Cataldo ............................... 152/399

FOREIGN PATENT DOCUMENTS 2432927  1/1976  Fed. Rep. of Germany ...... 152/330 RF
2030086  4/1980  United Kingdom ............... 152/387

Primary Examiner—H. Grant Skaggs
Attorney, Agent, or Firm—Becker & Becker, Inc.

[57] ABSTRACT

A vehicle wheel having a rigid wheel rim upon which a pneumatic belted tire is mounted. The beads of the tire contain pull-resistant cores, and are secured by a wheel flange against sliding laterally from the seating surfaces. A recess for receiving a tire bead during mounting of the tire is located adjacent to the seating surface on that side facing the rim middle. The seating surfaces are arranged on the inner periphery of the rim adjacent to a radially inwardly extending wheel flange. The base of the recess has a larger diameter than do the seating surfaces. The mantle surfaces of the rim adjacent to the recess are essentially even or smooth supporting surfaces for the tire zenith or crown portion during emergency operation of the tire. The middle portion of the rim, between the mantle surfaces, is also embodied at least partially as a supporting surface for the tire zenith portion during emergency operation of the tire, and the supporting surface lies essentially at the level of the mantle surfaces.

4 Claims, 1 Drawing Figure

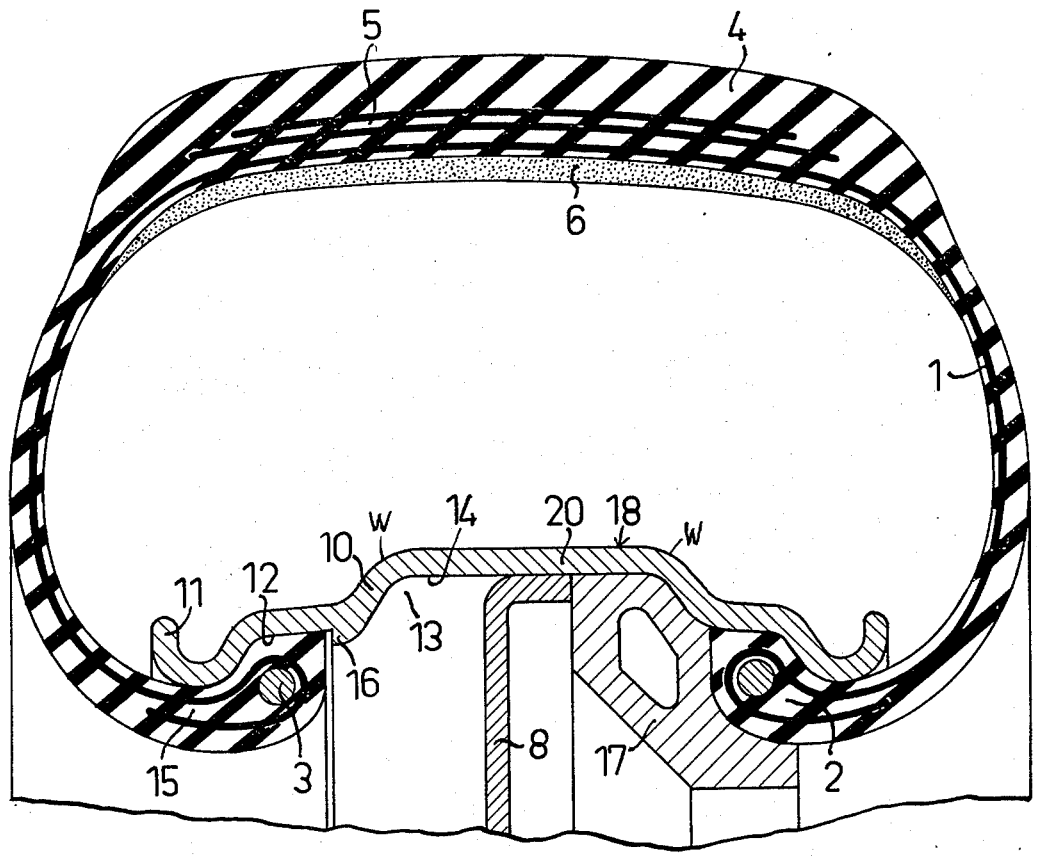

VEHICLE WHEEL

The present invention relates to a vehicle wheel having a rigid wheel rim upon which a pneumatic belted tire is mounted. The tire beads contain pull-resistant cores, and are secured by a wheel flange against sliding laterally from the seating surface. A recess for temporarily receiving a tire bead when the tire is mounted is located adjacent to the seating surface on that side facing the middle of the rim. The seating surfaces are arranged along the inner periphery of the rim adjacent to a wheel flange which extends radially inwardly therefrom. The base of the recess has a larger diameter than do the seating surfaces. The surfaces of the rim adjacent to the recess are essentially smooth or even supporting surfaces for the tire zenith or crown portion during emergency operation of the tire.

These recesses are generally circumferential grooves in the rim body. The recesses are necessary to make it possible to mount a tire having beads.

Additionally, it is known to provide support bodies between the wheel flanges along the outer periphery of the rim. The support bodies make it possible to support the tire body when the tire has been damaged by punctures or the like.

Previously, there was proceeded on the basis that an emergency operation is best assured if the damaged tire can be supported not only upon the narrow width centrally below the tread, but rather upon a comparatively wide wheel rim section, or upon two wheel rim sections which are arranged spaced from each other at a fairly great distance, in which case, however, care must be taken that during emergency operation a bulging or bending-out of the tire sidewalls must be possible.

According to the previous arrangements, the seating surfaces for the tire beads are located on the inner periphery of the rim adjacent to the wheel flange which extends radially inwardly and forms the edge of the rim toward the side in a conventional manner. Additionally, the base of the recess has a greater diameter than do the seating surfaces.

According to the previous arrangements, the surfaces of the rim adjacent to the recesses are essentially smooth or even support surfaces for the tire zenith or crown portion during emergency operation of the tire.

Although with the vehicle wheel of the previous arrangement, an enlargement of the overall supporting surfaces for the tire zenith portion was obtained during emergency operation of the tire as compared with known embodiments, previously known rim shapes hardly permitted any further optimization.

It is an object of the present invention to provide a vehicle wheel with which the overall supporting surface for the tire zenith or crown portion is considerably increased during emergency operation of the tire.

This object, and other objects and advantages of the present invention, will appear more clearly from the following specification in connection with the accompanying drawing, which shows a partial radial section through one embodiment of an inventive wheel for a road vehicle.

The vehicle wheel of the present invention is characterized primarily in that the middle portion of the rim, between the mantle surfaces, is also embodied at least partially as a supporting surface for the tire zenith portion during emergency operation of the tire, and furthermore in that the supporting surface essentially lies at the level of the mantle surfaces.

The present invention is based upon the recognition that with vehicle wheels of the aforementioned type, aside from over-wide wheels, mounting of a tire is also possible without the drop-base, drop-center, or well-base rim configuration which is normally worked into an associated rim. Consequently, it is inventively proposed to rely upon essential parts of a conventional drop-center volume for arrangement of further supporting surfaces at the level of the mantle surfaces of the rim.

An especially advantageous embodiment of the present invention with optimum size of the supporting surface results when the middle portion of the rim between the mantle surfaces is embodied as a hollow cylinder, the outer wall of which forms a cylinder mantle surface in common with the mantle surfaces.

Such a rim structure offers the great advantage of considerable gain in space in the interior of the rim body, for instance for the installation of larger discs and drums of brake systems, as well as other structural parts, for example for anti-blocking systems.

Furthermore, the present inventive rim is easier to produce than a drop-center rim.

Finally, less material is needed for a cylindrical middle portion of the rim than is needed for a drop-center configuration.

It is also possible to provide a rim structure in which the wall of the middle portion has a meander-shaped configuration. Circumferential crosspieces or webs may also serve as supporting surfaces.

Referring now to the drawing in detail, the pneumatic tire utilized for the vehicle wheel is made essentially of rubber or rubber-like material, and includes a radial carcass 1 which is anchored in the beads 2 by being looped around the pull-resistant bead cores 3. A belt 5, which brings about the side stabilization of the tire body, includes two or more cord-fabric layers, is pull-resistant in the peripheral direction, and is located below the tread 4, in particular between the tread and the carcass 1. Additionally, along the inner surface, approximately over the regions of the tread 4, the tire body is provided with a thin slide layer 6, which makes possible a supporting upon the wheel rim body, but can additionally also serve as a sealing layer in case of perforations or punctures.

The metallic outer body of the rim is welded to a dish or pan 8 in a known manner. This outer rim body collectively serves for holding the tire beads 2, and for supporting the tire in case of an emergency. The outer rim body collectively includes a middle part or portion 20, and on both sides thereof essentially transversely projecting flanges 10 as well as rim flanges 11 all in one piece therewith. Naturally, in accordance with the teaching of the present invention, a cast rim can also be utilized, for instance a light metal, e.g. aluminum or magnesium, rim.

The edges or flanges 10 terminate laterally outwardly between wheel or rim flanges 11, adjacent to and inwardly of which, upon the inner side of the outer rim body, there is provided a seating surface 12 for the tire beads 2. Adjacent to the seat 12 is a recess or depression 13 corresponding at least to the width of the tire beads 2. The base 14 of the recess 13 has a diameter which is considerably greater than the diameter of the seats 12.

A corresponding path or course of the flanges 10 exists on the outer side of the outer rim body, so that the greatest outer diameter is obtained in the region of the cylindrically extending mantle surfaces 18, which are directly contiguous to the middle portion 20.

In a preferred embodiment, this middle portion 20 is embodied as a hollow cylinder, the outer wall of which, with the surfaces 18, produces a common cylindrical surface, so that an optimum supporting surface is obtained for emergencies.

The middle portion 20 can, however, also have an external shape with which only those surfaces that lie at the level of the surfaces 18 serve as supporting surfaces. For example, the middle portion 20 can have a meander-shaped configuration. Such an embodiment represents a compromise between the requirement for an optimum size support surface, and remaining air volume within the outer rim body. Also, the middle portion 20 can include circumferential webs W which form supporting surfaces.

The tire beads 2 engage against the inner periphery of the outer rim body, in which connection the tire beads 2 engage a part of the wheel flanges 11. The tire sidewalls accordingly extend approximately axially parallel and laterally outwardly in that region 15 of the tire sidewalls located adjacent the tire bead 2. The tire sidewalls finally merge into the zenith or crown portion of the tire after making a wide swing in the shoulder portion.

The holding of the tire beads 2 upon the seats 12 can occur in a known manner by means of a circumferential projection 16, but can also be effected by retaining rings 17 which can be removable in the form of clamping rings.

To mount the pneumatic tire, a part of the periphery of a tire bead 2 is first introduced into a depression 13, so that the oppositely located part of the tire bead 2 can be moved over the wheel flange 11 onto the seat 12. The tire bead 2 can then be pulled or drawn out of the depressions 13 into the operating position, i.e. onto the appropriate seat 12.

If the tire body becomes damaged and deflated, the layer 6 can be supported upon the common cylindrical surface of the hollow cylindrical middle portion 20 and of the cylindrical surfaces 18 of the outer rim body, and possibly also on the externally adjacent surfaces 18.

In an emergency, i.e. when the tire has become damaged, it is important that the tire sidewalls can bulge or bend laterally outwardly without endangering the seat of the tire beads 2. Even during emergency operation, the support width of the tire corresponds essentially to the width of the tread 4.

The features of the present invention can be advantageously utilized with relatively flat tires, particularly with tires with which the H/W (Height/Width) ratio ranges approximately from 80% to 25%, preferably, however, from 65% to 40%. These flat tire cross sectional shapes or configurations are possible only because the holding or mounting support of the tire beads can be effected along the inner surface of the laterally outwardly placed surfaces 10.

Attention is directed to the fact that the bead cores 3 must have not only a sufficient tensile strength, but also a sufficiently great pressure or compression rigidity in the peripheral or tangential direction. This can be effected by a suitable selection of material, or by a special unification of individual core elements.

The seats 12, according to previously known models, should have an upward slope of approximately 5° to 15°, and in particular in such a manner that the laterally outer diameter of the seats is smaller than the diameter in the region facing the middle portion 20.

The present invention is, of course, in no way restricted to the specific disclosure of the specification and drawing, but also encompasses any modifications within the scope of the appended claims.

What we claim is:

1. A vehicle wheel having a rigid wheel rim for mounting thereon a pneumatic tire having relatively flat configuration with height/width ratio ranging from approximately 80% to 25% and having tire beads with pull-resistant cores movable over wheel flanges, said wheel rim including an outer unitary body which collectively extends substantially in the circumferential direction of said tire and comprises in combination therewith:

a middle portion of said unitary body of the rigid wheel rim which extends substantially in the circumferential direction of said tire;

respective transversely projecting flanges of said unitary body which are arranged laterally on each side of said middle portion integral therewith and extend substantially transversely thereto and radially inwardly to form a recess between said flanges on the inner periphery of said middle portion, said inner periphery of said middle portion forming the base of said recess, said recess having a width corresponding at least to the width of said respective tire beads, and serving to temporarily receive same during mounting of said tire; said transversely projecting flanges terminating laterally outwardly between respective laterally outwardly located wheel flanges of said unitary body which extend along inner space of the tire to permit bulging of the tire laterally outwardly during emergency running operation after leakage of air therefrom free of danger of tire destruction therewith;

respective seating surfaces of said unitary body, for said respective tire beads, located between said transversely projecting flanges of said middle portion and said laterally outwardly located wheel flanges, said seating surfaces being located on the inner periphery of said outer unitary body and adjacent to said recess, said laterally outwardly located wheel flanges extending radially of said seating surfaces, said laterally outwardly located wheel flanges securing said tire beads from sliding laterally from said seating surfaces, said base of said recess having a larger diameter than do said seating surfaces of said unitary body; and respective mantle surfaces on the outer periphery of said outer unitary body between said transversely projecting flanges and said middle portion adjacent to said recess, said mantle surfaces forming essentially planar supporting surfaces for the zenith portion of said tire during emergency operation thereof, that part of the outer periphery of said middle portion between said mantle surfaces also being, at least partially, embodied as an overall supporting surface considerably increased in axial width for said zenith portion of said tire during emergency operation of said tire, said supporting surface of said middle portion being located essentially at the level of said mantle surfaces collectively as a single, integral rim in one piece.

2. A vehicle wheel in combination according to claim 1, in which said middle portion of said outer unitary body essentially has a hollow one-piece cylindrical configuration.

3. A vehicle wheel in combination according to claim 2, in which the outer wall of said middle portion has a meander-shaped configuration.

4. A vehicle wheel in combination according to claim 2, which includes circumferential webs which form supporting surfaces.

* * * * *